Nov. 12, 1963 H. W. WESSELLS III 3,110,518
UNITIZED CONVERTIBLE UNDERBODY
Filed Aug. 31, 1962 3 Sheets-Sheet 3
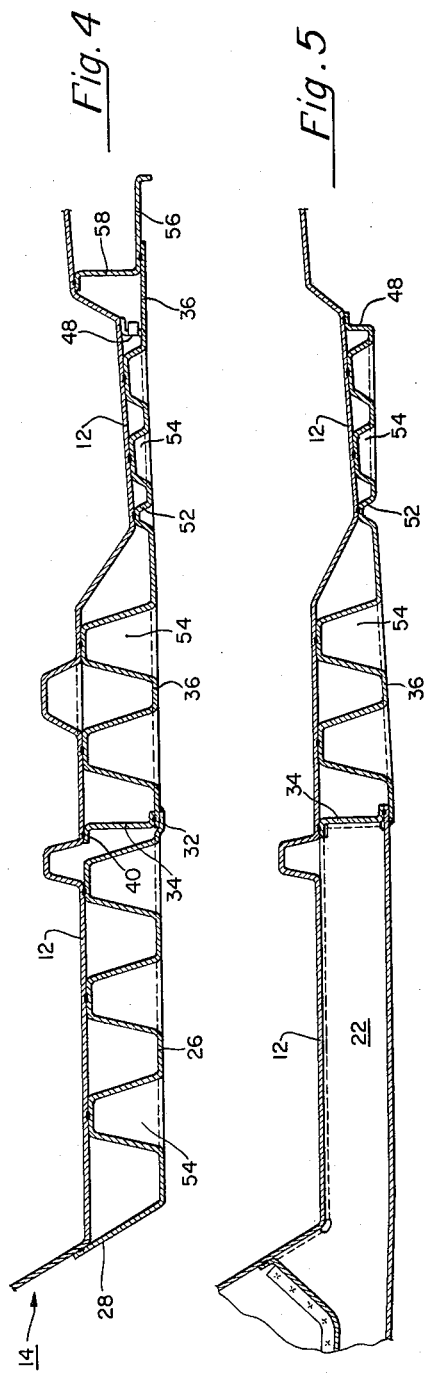
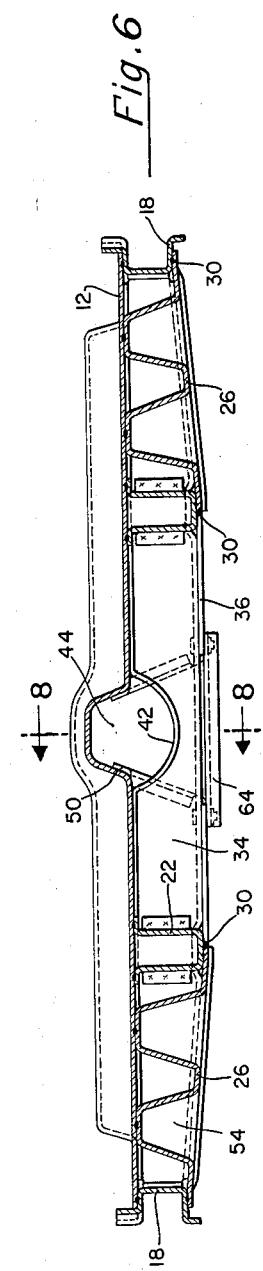
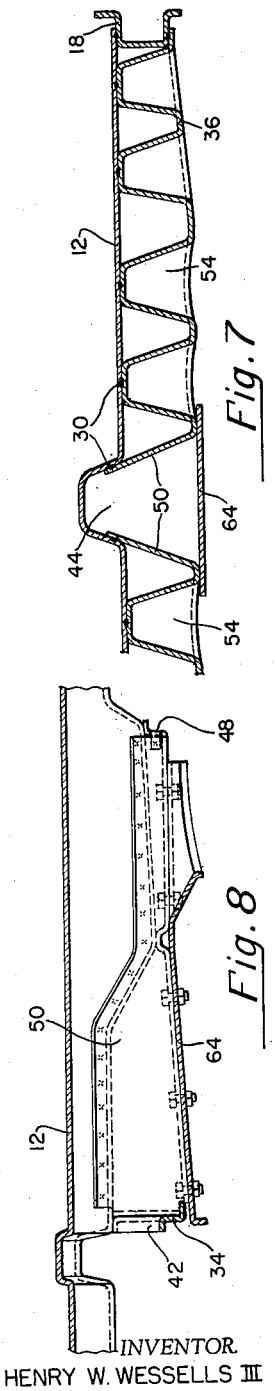
INVENTOR.
HENRY W. WESSELLS III
BY
ATTORNEY

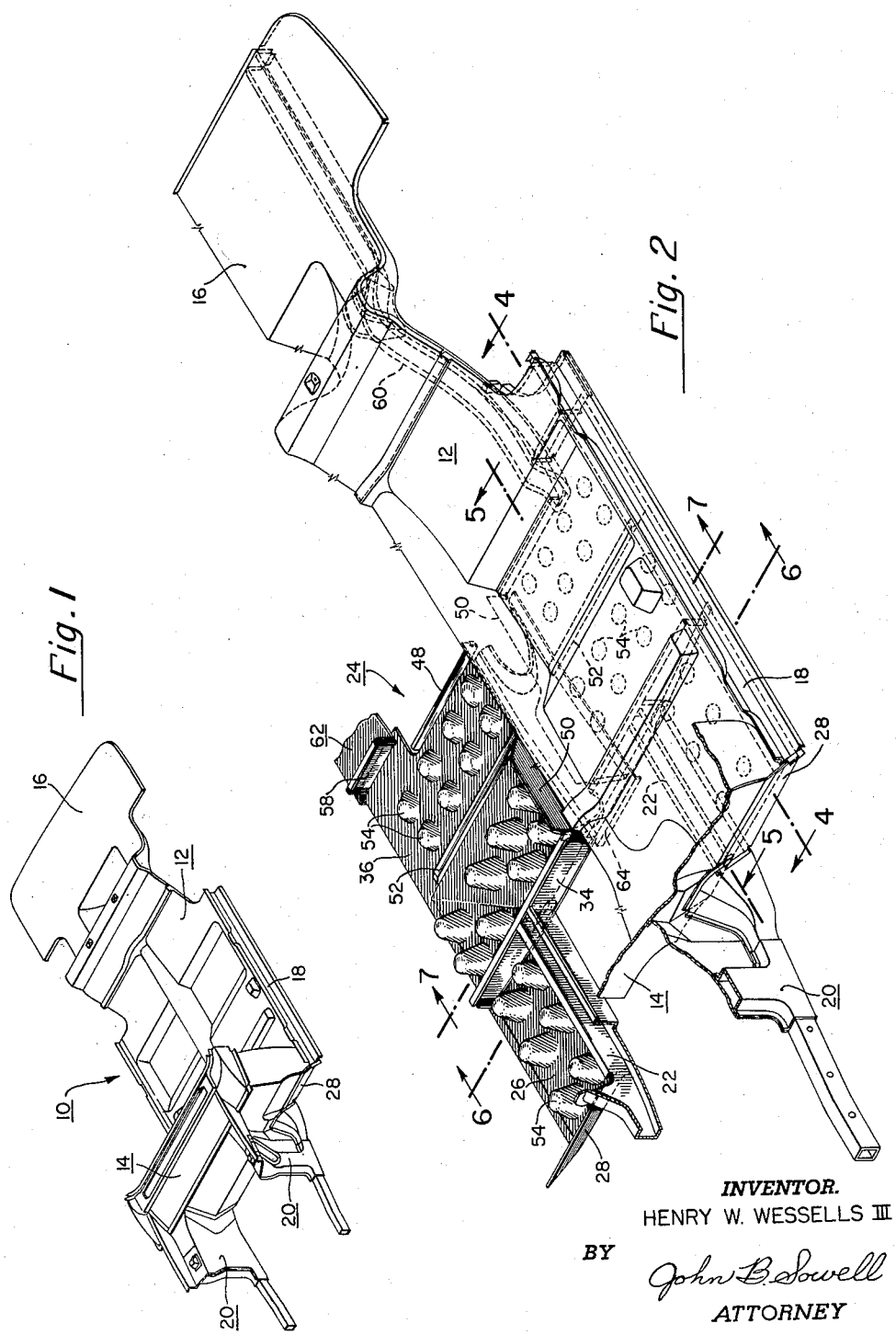

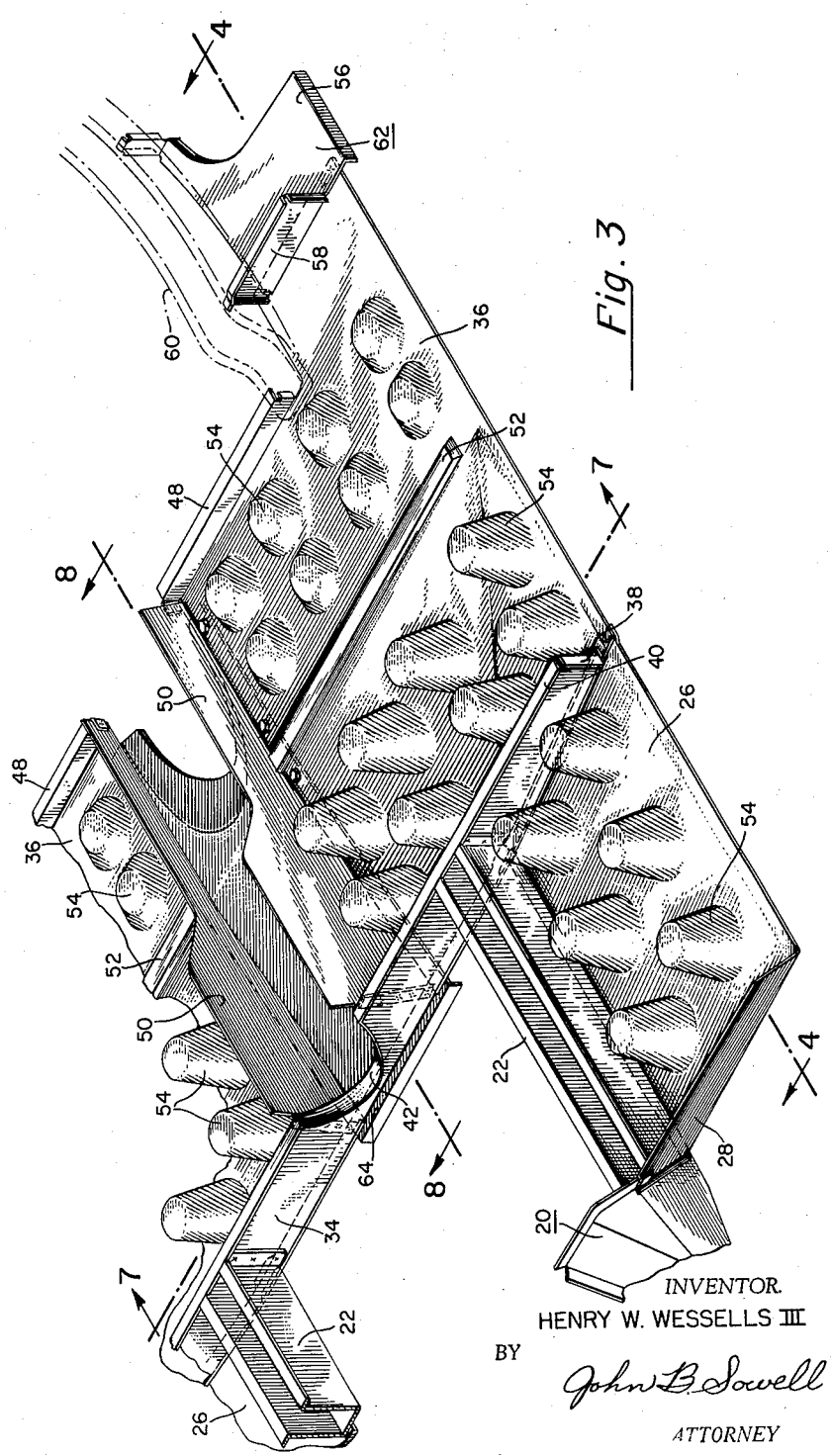

United States Patent Office 3,110,518
Patented Nov. 12, 1963

3,110,518
UNITIZED CONVERTIBLE UNDERBODY
Henry W. Wessells, III, Ardmore, Pa., assignor to The Budd Company, Philadelphia, Pa., a corporation of Pennsylvania
Filed Aug. 31, 1962, Ser. No. 220,686
9 Claims. (Cl. 296—28)

This invention relates to automobile body construction, and more particularly to a new reinforcing underbody for adapting conventional unitized sedan underbodies for use as convertible underbodies.

It is well known that the underframe and/or underbody of a convertible type automobile must be constructed to carry a larger load than a conventional sedan automobile. The balloon or upper body of an automobile carries part of the load, but the convertible body has no roof truss and does not lend itself to adaptataion as a load carrying structure.

In separate frame and body automobiles a heavier underframe is supplied for automobiles which will receive convertible type bodies. Similarly, in automobile bodies having unitized underframe and body construction heavy welded-on frames and side sills are supplied for convertible underbodies. Some manufacturers of unitized underframe and body automobiles, in addition to providing the above-mentioned heavy side sills, provide an X-frame similar to frames employed in non-unitized construction automobiles.

It is extremely desirable to be able to manufacture unitized underframe bodies for all basic passenger cars on the same production line and completely avoid scheduling of individual underframes or underbodies for intended use.

It is therefore a general object of the present invention to provide a novel underbody structure for a convertible automobile.

It is a further object of the present invention to provide a sub-assembly underbody for addition to the underbody of a standard sedan automobile.

It is another object of the present invention to provide a convertible automobile underbody having a continuous series box structure of high rigidity.

It is another object of the present invention to provide a compound curvature formed sub-assembly underfloor structure for attachment to the underbody of a unitized construction sedan.

Other objects and advantages and the manner in which they are obtained will become evident from the following description when read in connection with the drawings forming a part of this specification.

In the drawings:

FIG. 1 is a perspective view of the underbody of the present invention;

FIG. 2 is an enlarged perspective of FIG. 1 with the upper floor cut away to show the novel sub-assembly;

FIG. 3 is an enlarged partial perspective of the novel sub-assembly;

FIG. 4 is a longitudinal cross-section taken along the line 4—4 of FIGS. 2 and 3;

FIG. 5 is a longitudinal cross-section taken along the line 5—5 of FIG. 2;

FIG. 6 is a transverse cross-section taken along the line 6—6 of FIG. 2;

FIG. 7 is a transverse cross-section taken along lines 7—7 of FIGS. 2 and 3;

FIG. 8 is a longitudinal cross-section taken along lines 8—8 of FIGS. 3 and 6.

Referring now to FIG. 1 showing a complete underbody 10 assembled from sub-assemblies, there is provided a floor panel 12 which is basically a single formed sheet extending from the dash panel 14 rearward to the front spring hanger of the rear wheels (not shown). Floor panel 12 is continued by a rearward extension forming the rear floor panel 16. Floor panels 12 and 16 are recessed to provide an area for the rear wheel housing. Along the sides of floor panel 12 and attached thereto are side sills 18 extending below floor panel 12. The detailed structure of the rear floor panel 16 and floor panel 12 has been described and claimed in my copending application Serial No. 68,436 filed November 10, 1960, and now Patent No. 3,054,636, entitled "Automobile Body Construction."

Forward of the dash panel 14 is the front end unit assembly 20 which is attached to dash panel 14 and provided with rearward extending front floor reinforcement channels 22 extending beneath the floor panel 12 and attached thereto. The detailed structure of a front end assembly 20 similar to the illustrated front end assembly is described and claimed in my U.S. Patent No. 3,044,822 issued July 17, 1962. Floor panel 12, dash panel 14, side sills 18, front end assembly 20 and the stub front rails formed as front floor reinforcement channels 22 constitute an advanced unitized underbody structure 10 as presently employed in a sedan automobile.

Referring now to FIGS. 2 and 3 showing the novel lower underbody floor sub-assembly which may be attached to a conventional sedan underbody to provide a rigid torsion and bending resistant box structure for a convertible automobile underbody, there are provided front lower floor panels 26 each with an upturned front side 28 for attachment to dash panel 14 (shown in FIG. 4) and each is connected along its inner longitudinal edge to the bottom of reinforcement channel 22 and along its outer longitudinal edge to a side sill 18 by any conventional method such as welds 30 (shown in FIG. 6). The rear edges of front lower floor panels 26 are provided with transversely extending rear flanges 32 for connection to cross member 34 and rear lower floor panels 36. Cross member 34 is attached at its ends to side sills 18 by means of end flanges 38 and to the bottom of floor panel 12 by means of upper flanges 40. A depression 42 in the center of cross member 34 provides an enlarged aperture 44 between floor panel 12 and cross member 34 at the drive shaft housing.

As shown in FIG. 6, the aperture 44 is sufficiently large to provide for passage of the drive shaft, exhaust pipes and hydraulic lines without the necessity of diminishing the ground clearance below side sills 18 or channels 22.

Rear lower floor panels 36 are connected at their forward transverse edges to cross member 34 and front lower floor panels 26 as shown in FIGS. 4 and 5, and connected along their longitudinal edges to the floor panel 12 and side sills 18 by conventional means such as welds 30 as shown in FIG. 7. A rear transverse flange 48 is provided on each panel 36 for attachment to the floor panel 12. The upturned longitudinal sides 50 of floor panels 36 follow the contour of the transmission housing tunnel shaped in the floor panel 12. A transverse raised shape 52 is formed in the floor panel 36 for attachment to floor panel 12 as shown in FIGS. 4 and 5. It will be noted that compound curvature raised shapes 54 may be provided as an alternative to the transverse raised shape 52 and provide the additional advantage of structural rigidity in more than one direction. However, the ability to form the deep forming shapes 54 may prevent their employment in some areas and the more easily formed elongated shapes like shapes 52 and those shown in panel 12 may be employed.

Along a rear edge of floor panels 36 are braces 56 having raised flanges or vertical braces 58 attached between floor panels 36 and floor panel 12. The longitudinal edges of braces 56 are attached to side sills 18 and rear longitudinal sills 60 providing conventional torque boxes 62 between the side sills 18 and rear sills 60.

Bridge plate 64 is provided as a rigid structural member to connect rear lower floor panels 36 as shown in FIGS. 6 and 7. The plate 64 may be welded to panels 36 or alternatively made as a removable member and bolted to panels 36 as shown. The rear edge of bridge plate 64 may be notched and/or depressed as shown in FIG. 8 to provide additional clearance for a slanting drive shaft.

As shown in FIGS. 6 and 7, the front lower floor panels 26 are interconnected along their edges to side sills 18 and front floor reinforcement channels 22, and through their turned flanges and the cross member 34 to floor panel 12, thus, forming a rigid structural box therewith. As shown in FIGS. 5 and 7, rear lower floor panels 36 are connected at their edges to side sills 18 and cross member 34, and at their upturned edges or flanges to the floor panel 12 forming a rigid box structure therewith. As shown in FIGS. 6 to 8, bridge plate 64 interconnects the rigid box structures formed by the rear lower floor panels 36 and the floor panel 12, and forms an additional interconnecting box structure therewith.

It is well known that torsional and bending stresses are imposed on the underbody of an automobile when one of the four wheels strikes an irregularity in the road surface tending to twist or bend the structural underbody between the front and rear wheels in a clockwise or counterclockwise direction. It will be seen that the box structures hereinbefore described react as a series of structural stiffeners in both the longitudinal and transverse directions. The continuous box structures provide a much stiffer and more rigid underbody than could be possibly achieved by adding structural shapes as cross members or adding heavy plates and reinforcement panels to the side sills and/or providing the conventional X-frame or chassis underbody assembled from structural shapes.

In addition to providing a stiffer torsional and bending resistant underbody the novel sub-assembly permits manufacture of conventional underbodies for all types of vehicles, providing however, the novel sub-assembly is added to the conventional underbody for automobiles which require the additional strength or are to be employed for heavy purposes.

Not only is the structure more desirable from the standpoint of scheduling the manufacture of underbodies but permits a substantial weight saving as well as a saving in the cost of assembly. This novel structure takes advantage of recent developments permitting the use of thin gage rust resistant components in the underbody such as galvanized or plastic coated metals. It will be noted that the novel sub-assembly underbody has not diminished the ground clearance or added any additional reinforcing structure above the automobile floor as is conventional with prior art types of convertible underbodies, but has so combined the novel sub-assembly to cause the floor panel 12 (a formed sheet) to carry part of the torsion load which has conventionally been carried by heavy side sills and/or heavy underframes.

While a single embodiment of the novel sub-assembly box structure underframe has been shown by way of illustration it is to be understood that modifications of the box structures may be made without departing from the present invention which is only limited by the appended claims.

What is claimed is:

1. An automobile underbody construction comprising in combination, a pair of longitudinally displaced side sills, an upper floor pan connected to a top flange on said side sills, a pair of longitudinally displaced front floor channel reinforcement members parallel to said side sills and connected to the bottom of said upper floor pan, a transverse cross member connected to said side sills at its ends and to the bottom of said upper floor pan at its top flange, a pair of front lower floor pans each connected to the bottom of said transverse cross member and said upper floor pan and to the bottom of a side sill and a front floor channel to form rigid box structures therewith, a pair of rear lower floor pans each having a transverse rear upturned flange forming a rear cross member and a longitudinal upturned flange forming a center sill, said rear lower floor pan being connected to the bottom of said transverse cross member and said upper floor pan to form box structures therewith, and a reinforcing bridge plate connected to the bottom of said rear lower floor pans along said longitudinal upturned flange and forming a box section therewith whereby the interconnected said box structures form a rigid torsion, resistant underbody construction.

2. An automobile underbody construction as set forth in claim 1 which further includes reinforcing raised formations on said front lower floor pans interconnecting said front lower floor pans and said upper floor pan.

3. An automobile underbody construction as set forth in claim 2 which further includes raised reinforcing formations on said rear lower floor pans interconnecting said rear lower floor pans and said upper floor pan.

4. An automobile reinforcing sub-assembly for addition to the underbody of a unitized underbody construction characterized by an upper panel having a central longitudinal tunnel therein and front and rear rails extended therefrom and framed at the longitudinal edges by side sills comprising, a pair of front lower floor panels attached between the side sills and the front rails and interconnected to said upper panel at their front and rear edges, a pair of rear lower floor panels interconnected to said upper panel at their front and rear edges and attached to said side sills and said tunnel of said panel, said front and rear lower floor panels being interconnected to form continuous torsion box structures with said upper panel, and a cross member attached to said rear lower floor panels across said tunnel forming a connection with said upper panel whereby said panels and said cross member cooperate with said underbody to form a reinforcement underbody.

5. An automobile body sub-assembly as set forth in claim 4 which further includes raised shapes formed in said lower floor panels attached to said upper panel for rigidifying the reinforcement connection with said underbody.

6. An automobile sub-assembly for addition to an underbody having a floor panel, side sills and stub front rails comprising, a pair of front lower floor panels connectable to said floor pan said side sills and said stub front rails and disposed below said floor panel to form a pair of first box structures therewith, a pair of rear lower floor panels connectable to said floor panel, said side sills and said first box structures to form a pair of second box structures therewith, and a bridge plate connecting said pair of second box structures to form a continuous series of box structures between said side sills when said lower panels are connected thereto.

7. An automobile body sub-assembly as set forth in claim 6 wherein said rear-lower floor panels and said bridge plate form a continuous plate interconnecting the lower flanges of said side sills and forming a lower floor pan structure approximately parallel and below said upper floor panel.

8. An automobile body sub-assembly as set forth in claim 6 wherein said floor panel, side sills, lower floor panels, and bridge plates are connected to each other by means of lap flanges, and said connections are made by welding through said flanges.

9. An automobile body sub-assembly as set forth in claim 6, which further includes a cross member connected to said floor member at the junction of said first and said second pair of box structures.

References Cited in the file of this patent

UNITED STATES PATENTS

| | | |
|---|---|---|
| 2,140,476 | Ledwinka | Dec. 13, 1938 |
| 2,230,448 | Best | Feb. 4, 1941 |
| 2,297,198 | Borgward | Sept. 29, 1942 |
| 2,645,519 | Stanfield et al. | July 14, 1953 |